US006278101B1

(12) United States Patent
Puyot

(10) Patent No.: US 6,278,101 B1
(45) Date of Patent: Aug. 21, 2001

(54) METHOD FOR INCREASING THE NATIVE RESOLUTION OF AN IMAGE SENSOR

(75) Inventor: Michael Angel Puyot, Escondido, CA (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/369,223

(22) Filed: Aug. 5, 1999

(51) Int. Cl.$^7$ ............................................. H01J 40/14
(52) U.S. Cl. ................................. 250/208.1; 358/474
(58) Field of Search .................... 250/208.1; 358/474, 358/475, 480, 481, 493, 494

(56) References Cited

U.S. PATENT DOCUMENTS

| | | | |
|---|---|---|---|
| 4,709,144 | 11/1987 | Vincent | 250/226 |
| 4,870,268 | 9/1989 | Vincent et al. | 250/226 |
| 4,926,041 | 5/1990 | Boyd | 250/226 |
| 5,038,028 | 8/1991 | Boyd et al. | 250/208.1 |
| 5,227,620 | 7/1993 | Elder, Jr. et al. | 250/208.1 |
| 6,112,003 | * 8/2000 | Bybee et al. | 385/116 |
| 6,160,249 | * 12/2000 | Webb et al. | 250/208.1 |

OTHER PUBLICATIONS

Restoration of a Single Super Resolution Image from Several Blurred, Noicy and Under Sampled Measured Images of Michael Eld and Arie Feuer, IEEE Transactions on Image Processing, vol. 6, No. 12, Dec. 1997.

* cited by examiner

Primary Examiner—Stephone B. Allen

(57) ABSTRACT

A method for increasing a native resolution of an image sensor utilized in a scanner apparatus to produce image data representative of an object, comprising moving at least a portion of an imaging assembly associated with the image sensor along a scanning axis during a first scanning sweep to produce a first image data set representative of the object being scanned, the first image data set having the native resolution; moving said at least a portion of an imaging assembly associated with the image sensor along the scanning axis during a second scanning sweep to produce a second image data set representative of the object being scanned, the secod image data set having the native resolution, the positions of the image sensor during the second scanning sweep being displaced from corresponding positions of the image sensor during the first scanning sweep by mechanical free play in the scanner; and combining the first image data set, and the second image data set having a resolution that is greater than the native resolution, and an apparatus for performing the method.

10 Claims, 4 Drawing Sheets

METHOD FOR INCREASING THE NATIVE RESOLUTION OF AN IMAGE SENSOR

FIELD OF INVENTION

The present invention relates to optical scanners in general and more specifically to methods for increasing the native resolution of an optical scanner.

BACKGROUND

Optical scanner devices, such as flat bed scanners, are well-known in the art and produce machine-readable image data signals that are representative of a scanned object, such as a photograph or a page of printed text. In a typical scanner application, the image data signals produced by a scanner may be used by a personal computer to reproduce an image of the scanned object on a suitable display device, such as a CRT or a printer.

A typical flat bed scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the imaging assembly, i.e., the illumination, optical and sensor devices with respect to the object. In some scanners only a portion of the imaging assembly moves, e.g., a document support platen or a mirror assembly. In other scanners the entire imaging assembly moves.

By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector.

The photosensitive detector used to detect the image light focused thereon by the optical system may be a charge-coupled device (CCD), or other photosensor devices such as a contact image sensor (CIS). A typical CCD may comprise an array of individual cells or "pixels," each of which collects or builds-up an electrical charge in response to exposure to light. The quantity of the accumulated electrical charge in any given cell or pixel is related to the intensity and duration of the light exposure, thus a CCD may be used to generate electronic data representative of the brightness or darkness of the image portion focused on each pixel.

Flat bed scanners and various components thereof are disclosed in U.S. Pat. No. 4,926,041 for "Optical Scanner" of David Wayne Boyd; U.S. Pat. No. 4,709,144 for "Color Imager Utilizing Novel Trichromatic Beam Splitter And Photosensor" of Kent J. Vincent; U.S. Pat. No. 4,870,268 for "Color Combiner And Separator And Implementations" of Kent J. Vincent and Hans D. Neuman; U.S. Pat. No. 5,038,028 for "Optical Scanner Aperture And Light Source Assembly" of Boyd, et al.; and U.S. Pat. No. 5,227,620 for "Apparatus For Assembling Components of Color Optical Scanners" of Elder, et al., each of which is incorporated herein by reference for all that is disclosed therein.

In most optical scanner applications, each of the individual pixels in the CCD are arranged end-to-end in a straight line, thus forming a linear array. At any given point of time during scanning each pixel in the CCD array corresponds to a related pixel portion of the illuminated scan line. The individual pixels in the linear photosensor array are generally aligned in the "cross" direction, i.e., perpendicular to the direction of movement of the illuminated scan line across the object (also known as the "scan direction"). Each pixel of the linear photosensor array thus has a length measured in the cross direction and a width measured in the scan direction. In most CCD arrays, the lengths and widths of the pixels are equal, typically being about a microns or so in each dimension.

The resolution of the sensor in the cross direction is a function of the number of individual cells in the CCD. For example, a commonly used CCD photosensor array in a low cost scanner contains a sufficient number of individual cells or pixels to allow a resolution in the cross direction of about 300 pixels, or dots, per inch (ppi or dpi), which is referred to herein as the "native resolution" in the cross direction.

The resolution in the scan direction is inversely related to the product of the scan line sweep rate and the CCD exposure time (i.e., the sampling interval). Therefore, the resolution in the scan direction may be increased by decreasing the scan line sweep rate, the CCD exposure time, or both. Conversely, the resolution in the scan direction may be decreased by increasing the scan line sweep rate, the CCD exposure time, or both. The "minimum resolution in the scan direction" for a given exposure time is that resolution achieved with scanning at the maximum scan line sweep rate. For example, a maximum scan line sweep rate of about 3.33 inches per second and a maximum exposure time of about 5 milliseconds will result in a minimum resolution in the scan direction of about 60 dpi.

The resolution in the cross direction may be increased over the native resolution in the cross direction by using various data interpolation techniques to increase the effective resolution in the cross direction. For example, some data interpolation techniques can be used to increase the effective resolution in the cross direction to 600 or even 1200 dpi with a CCD having a native resolution in the cross direction of only 300 dpi.

As mentioned above, the resolution in the scan direction is a function of the scan line sweep rate as well as the CCD exposure time. Therefore, the resolution in the scan direction can be varied by changing the scan line sweep rate, the CCD exposure time, or both. It should be noted that the resolution in the scan direction corresponding to a given maximum scan line sweep rate and CCD exposure time is fixed and represents the minimum resolution in the scan direction.

While the techniques described above are useful in increasing the resolution in both the cross and scan directions, they are not without their disadvantages. For example, the interpolation techniques used to increase the resolution in the cross direction may require substantial amounts of processor time and/or memory, requiring either increased time to perform the scan operation or requiring faster processors and/or more memory if such higher resolutions are to be achieved without adversely affecting the overall scan time. Similarly, increasing the resolution in the scan direction may require either slower sweep rates, CCD exposure times, or both. Decreasing the sweep rate increases the time required to perform the scan, whereas decreasing the CCD exposure time may result in decreased image quality, or may require a more sensitive CCD array if image quality is to be preserved at such decreased exposure times.

SUMMARY OF THE INVENTION

The present invention may comprise a method for increasing a native resolution of an imaging assembly utilized in a scanner apparatus to produce image data representative of an object may comprise the steps of: initiating a first scanning sweep by moving at least a portion of the imaging assembly along a scanning axis to produce a first image data set representative of the object being scanned, the first image data set having the native resolution; initiating a second scanning sweep by moving at least a portion of the imaging assembly along the scanning axis to produce a second image data set representative of the object being scanned, the second image data set having the native resolution, the positions of the at least a portion of the imaging assembly during the second scanning sweep being displaced from corresponding positions thereof during the first scanning sweep; and combining the first image data set and the second image data set to produce a high resolution image data set, the high resolution image data set having a resolution that is greater than the native resolution.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
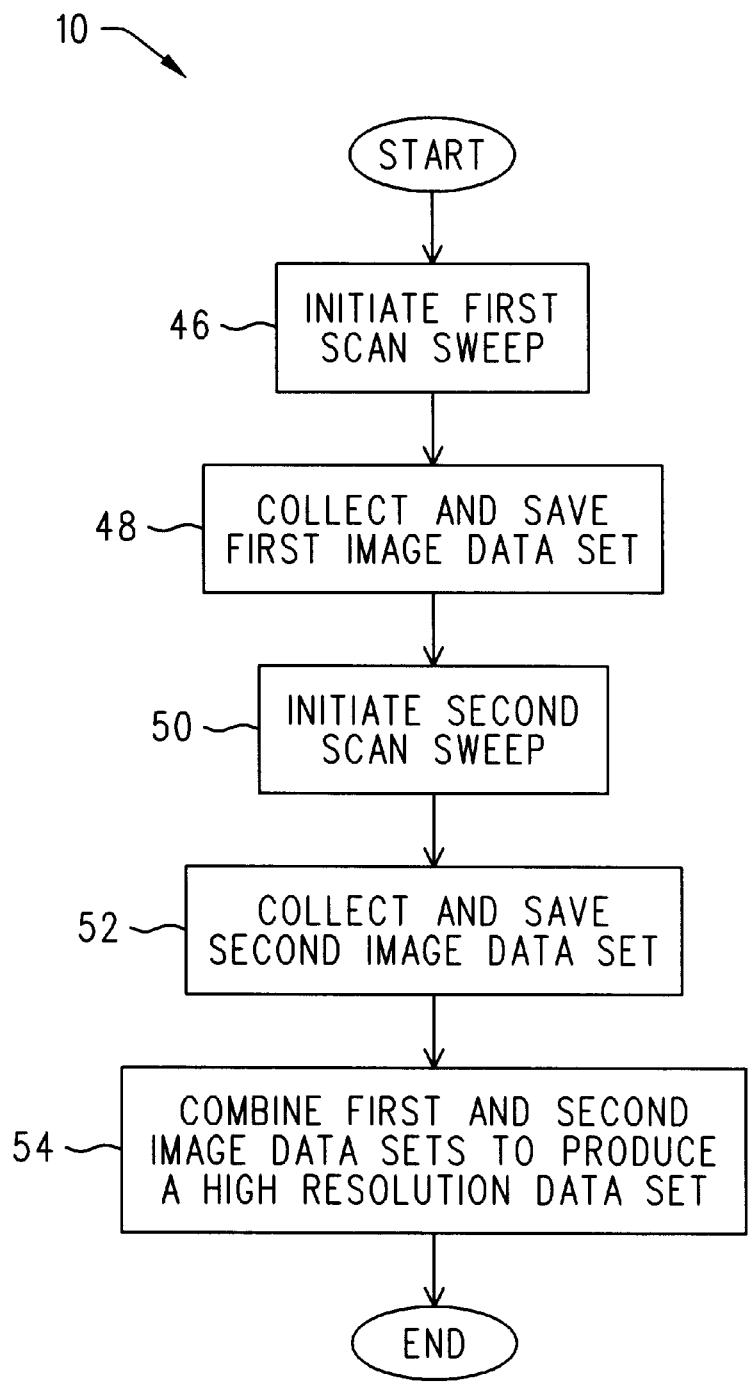
FIG. 1 is a flow diagram of a method for increasing the native resolution of a scanner.
Figure 2:
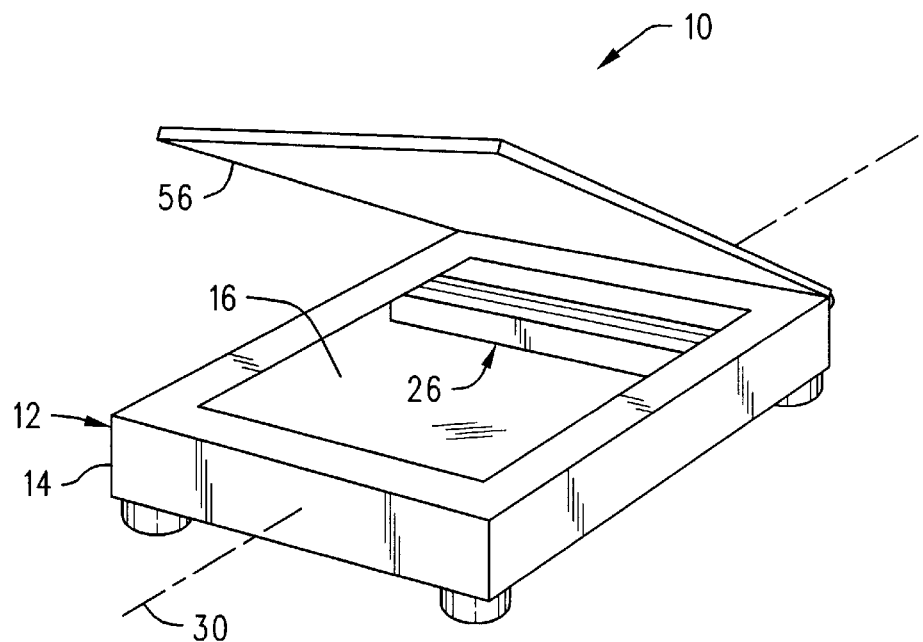
FIG. 2 is a perspective view of a flat-bed scanner utilizing the method of FIG. 1 for increasing its native scan resolution.

A method 10 for increasing a native resolution of an image sensor is shown in FIG. 1 and may be implemented on a flat bed scanner 12 shown in FIG. 2. As will be discussed in greater detail below, the method 10 comprises the steps of initiating two separate scanning sweeps to produce two corresponding image data sets. Thereafter, the two corresponding image data sets may be combined to produce a high resolution image data set. However, for ease of explanation and understanding of the method 10, it is convenient to first describe one flat bed scanner 12 on which the method may be implemented. Then, the method for increasing resolution as it may be used in conjunction with the flat bed scanner 12 is more easily described and understood.

Figure 3:
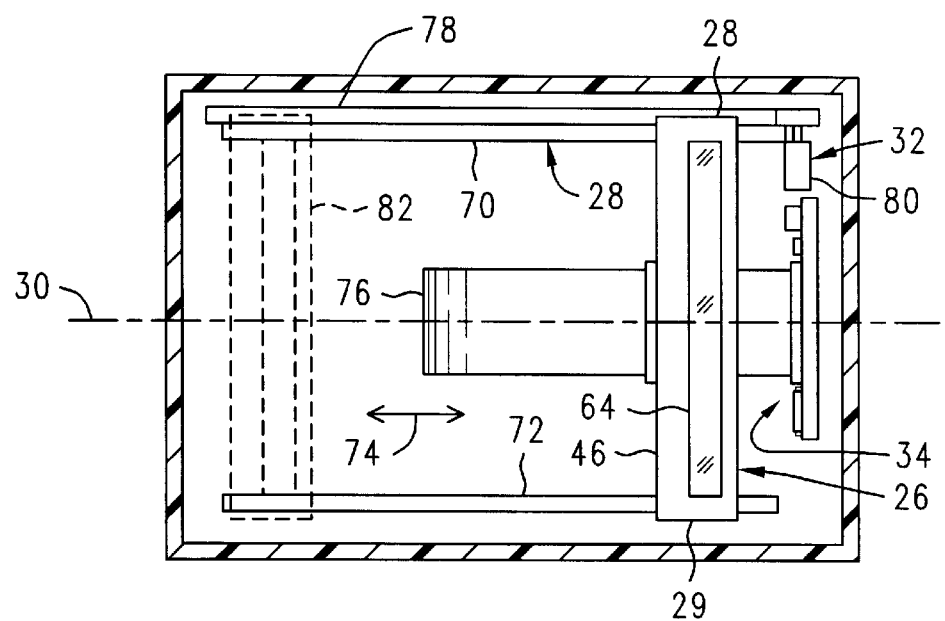
FIG. 3 is a plan view of the flat bed scanner of FIG. 2 with the platen removed to show the moveable carriage assembly.
Figure 4:
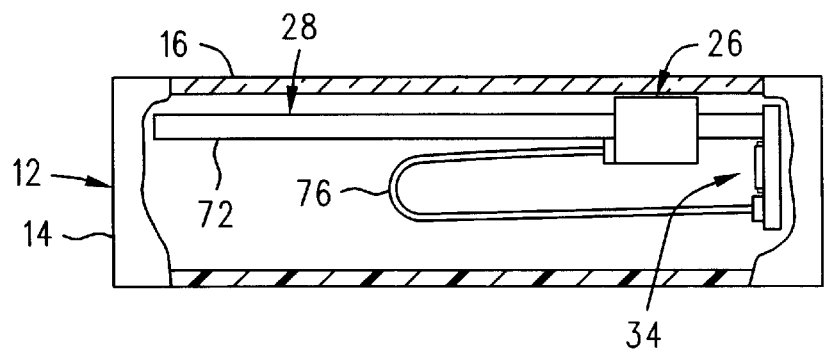
FIG. 4 is a side view in elevation of the flat bed scanner with a portion of a side broken away to reveal the moveable carriage assembly.

Referring now to FIGS. 2–4, the flat bed scanner 12 may comprise a generally rectangular housing 14 having a transparent platen 16 on which may be placed an object 18 (FIG. 7), such as a document 20 with written text 22 provided thereon. The scanner 12 may also be provided with an image sensor 24 (FIGS. 5 and 6) which produces image data (not shown) in response to image light (not shown) reflected by the object 18 being scanned. In the embodiment shown and described herein, the image sensor 24 may be mounted to a moveable carriage assembly 26 that is positioned underneath the transparent platen 16. The moveable carriage assembly 26 may be affixed to a mounting system 28 (FIG. 3) which allows the carriage assembly 26 to move back and forth along a scanning axis 30. A carriage drive system 32 (FIG. 3) operatively associated with the carriage assembly 26 may be used to move the carriage assembly 26 back and forth along the scanning axis 30 at the appropriate speed to accomplish scanning of the object 18 when the same is positioned on the transparent platen 16. The flat bed scanner 12 may also be provided with an image processing system 34 for receiving the image data (not shown) produced by the image sensor 24 and for processing the image data according to the method 10. The processor of the image processing system 34 may also be used to operate the various other systems of the flat bed scanner 12, such as the carriage drive system 32, etc.

In the embodiment shown and described herein, the arrangement of the carriage assembly 26 and mounting system 28 is such that a certain amount of mechanical "free play" exists. Such mechanical free play is present to some degree in all mechanical systems and is generally impossible to eliminate. In one embodiment of the present invention, the mechanical free play is such that the carriage assembly 26 will have its central axis CC skewed in a first angular direction at a small angle "a" which may be, e.g., 0.1° to 10° and preferably less than about 2° relative to an axis PP perpendicular to a scan axis 30 when the carriage assembly is moving in first scan direction 42. The free play causes the carriage assembly to be skewed at a small angle "b" in the opposite angular direction from "a" when the scanner carriage is moved in scan direction 43. Depending upon the nature of the free play various portions of the carriage may be more or less laterally offset during movement in the second scan direction, as well as skewed, with respect to their positions in the first scan direction. As a result, of the different orientation of the carriage assembly 26 an image constructed from an image data set generated in the first scan direction will be skewed relative to an image constructed from an image data set generated in the second scan direction. For example, with reference to FIG. 7, a scan line 36 captured by the image sensor 24 on a first scanning sweep in direction 42 generally will be skewed at an angle a+b with respect to a scan line 36' captured on a second scanning sweep in direction 43. Stated another way, the second scan line 36' captured during the second scanning sweep will be displaced from the corresponding position of the first scan line 36 captured during the first scanning sweep. Similarly, an $n^{th}$ scan line 38 captured during the first scanning sweep will be displaced with respect to a corresponding $n^{th}$ scan line 38' captured during the second scanning sweep.

Figure 7:
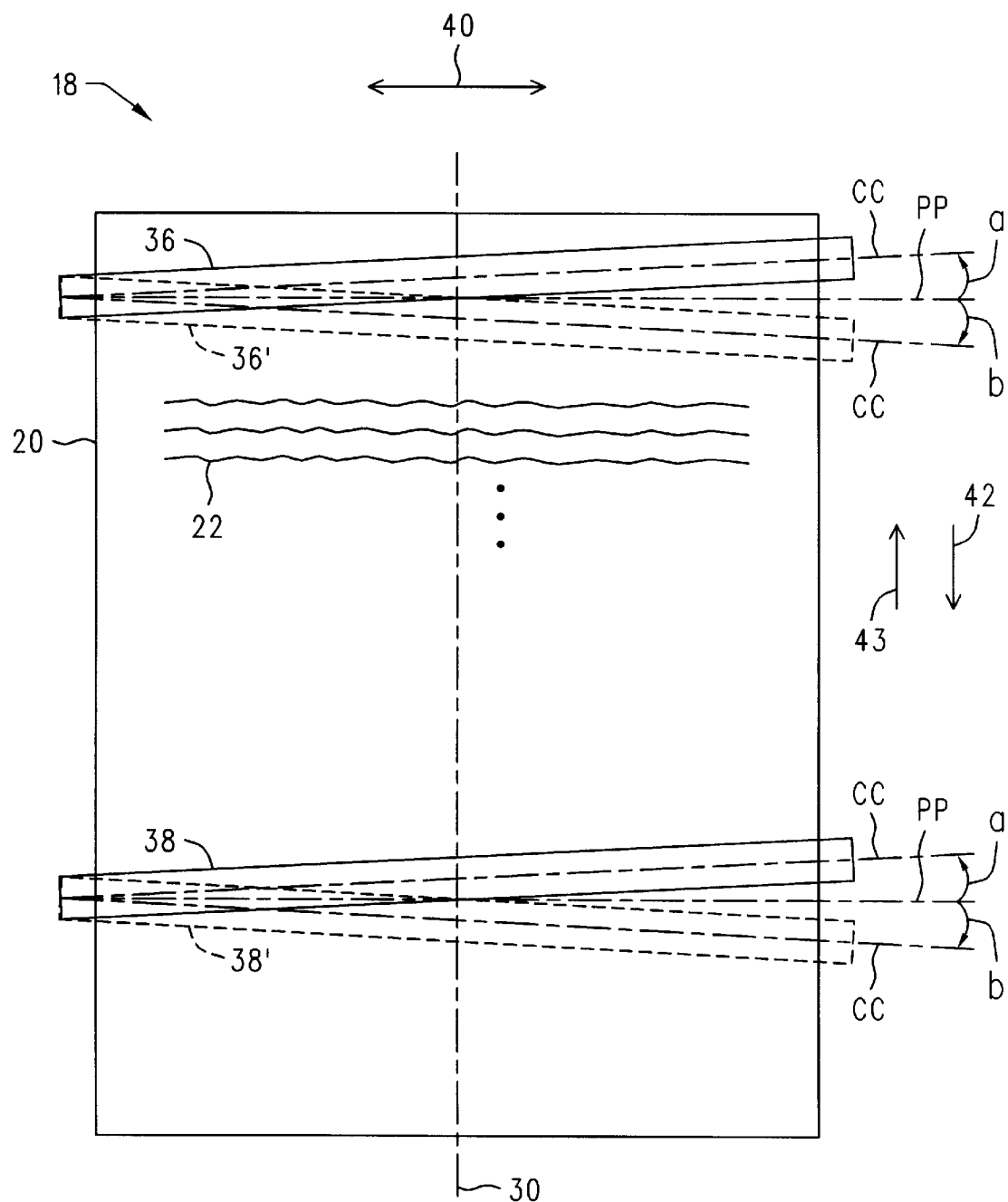
FIG. 7 is a plan view of a document to be scanned illustrating in an exaggerated manner the displacement of the scan lines from different scans at various positions along the document resulting from mechanical free play associated with the moveable carriage assembly.

The mechanical free play associated with the carriage assembly 26 illustrated in FIG. 7 is the type which occurs when an end (left end in this embodiment) of the carriage which is pulled by a drive belt moves slightly ahead of the other end during scanning in each scanning direction 42, 43. In this type of free play the displacement or shift between pixels of corresponding scan lines (e.g., 36 and 36') on successive scanning sweeps (e.g., the first scanning sweep and the second sweep) may occur in both the cross direction (indicated by arrows 40) and the scan direction (indicated by arrows 42, 43). Further, the magnitude of the displacement need not be consistent among the various pixels on corresponding scan lines. For example, in the situation illustrated in FIG. 7, a pixel on the left end of the scan line 36 and a pixel on the left end of corresponding scan line 36' are displaced relative each other less in both the scan and cross scan directions than pixels located at the right end of each scan line.

Referring back now to FIG. 1, the method 10 for increasing the native scan resolution may comprise a first step 44 of initiating a first scanning sweep of the object 18. Generally speaking, the first scanning sweep will begin with the carriage assembly 26 being located at an initial or home position 46, as best seen in FIG. 3. From the home position 46, the carriage drive system 32 will move the carriage assembly 26 along the scanning axis 30 toward the final position 82. As the carriage assembly 26 is moved, the image sensor 24 will collect image data relating to a plurality of scan lines (e.g., 36 and 38, FIG. 7). The resulting image data may be stored in a suitable memory system (not shown) associated with the image processing system 34 at step 48. At the conclusion of step 48, the carriage drive system 32 may return the carriage assembly 26 to the home position 46. At this point, the memory system (not shown) associated with the image processing system 34 will contain a first image data set that is representative of the object 18 captured during the first scanning sweep. The first image data set will have a given or native resolution in the cross direction (e.g., 300 pixels per inch (ppi)) as well as a given or native resolution in the scan direction (e.g., 300 ppi).

A second scanning sweep may than be initiated at step 50. The second scanning sweep may be similar to the first scanning sweep but in reverse, with the carriage assembly 26 beginning at about the final position 82 (FIG. 3) and moving along the scanning axis 30 in direction 43 (FIG. 7) toward the home position 46 to accomplish scanning of the object 18. The second scanning sweep will result in the production of a second image data set which thereafter may be stored in the memory system (not shown) associated with the image processing system 34 during step 52. The second image data set collected during the second scanning sweep will also have the same given or native resolutions in the cross and scan directions as the first image data set. For example, in the embodiment shown and described herein, the given or native resolutions in the cross and scan directions may also be about 300 ppi. However, as discussed above, the mechanical free play associated with the carriage mounting system 28 will cause the carriage assembly 26, and thus image sensor 24, during the second scanning sweep to be displaced slightly from corresponding scan line positions associated with the first scanning sweep. For example, a scan line 36' captured during the second scanning sweep may be skewed at an angle a+b with respect to the corresponding scan line 36 captured during the first scanning sweep. See FIG. 7. Consequently, the second image data set collected during the second scanning sweep will represent slightly different portions of the object 18 than those collected during the first scanning sweep.

Having collected the first and second image data sets, the method 10 may then proceed to step 54 which combines the first and second image data sets to produce a high resolution data set. Generally speaking, the high resolution data set will have resolutions in the cross and scan directions that are greater, possibly twice as great as those associated with the first and second image data sets. For example, in the embodiment shown and described herein, the high resolution data set will have an increased resolution in the cross direction and thus greater than 300 ppi as well as an increased resolution in the scan direction and thus greater than 300 ppi. The increase in the native resolution of the image sensor is due to the displacement or shift of the scan lines (e.g., 36, 36') between successive scans. Methods for combining different image data sets representative of the same object in order to achieve improved resolution are known in the art. See for example, Restoration of a Single Super Resolution Image from Several Blurred, Noisy and Under Sampled Measured Images of Michael Elad and Arie Feuer, IEEE Transactions on Image Processing, Vol. 6, No. 12, December 1997, which is incorporated herein by reference. The methodology described in this article, or other methodology, may be employed for the image combination step 54.

Having briefly described the method 10 for increasing the native resolution of an image sensor as well as some of its more significant features and advantages, the various embodiments of the method for increasing the native resolution of an image sensor will now be described in detail. However, before proceeding with the detailed description it should be noted that while the method is shown and described herein as it could be used in conjunction with one type of flat bed scanner, it is not limited to use with any particular type or style of scanner or any particular source of mechanical free play. Indeed, the method may be used with any of a wide range of electronic scanner devices that are now known or that may be developed in the future that utilize a mounting system for moving the object and imaging assembly, or a portion thereof, with respect to one another that has some degree of mechanical free play. Consequently, the method of the present invention should not be regarded as being limited to the particular applications and situations shown and described herein.

With the foregoing considerations in mind, the various process steps of one embodiment 10 of the method for increasing the native resolution of an image sensor are shown in FIG. 1. As was briefly discussed above, the method 10 is shown and described herein as it may be implemented on a flat bed scanner 12 shown in FIG. 2, although the method 10 also could be used in conjunction with other types of scanners now known or that may be developed in the future, as mentioned above.

With reference now primarily to FIGS. 2–4, the flat bed scanner 12 on which the method 10 may be implemented may comprise a generally rectangular chassis or housing 14 which is sized to receive and support the various components of the flat bed scanner 12. For example, in the embodiment shown and described herein, the housing 14 may be provided with a transparent platen 16 suitable for receiving the object 18 to be scanned. The transparent platen 16 may comprise any of a wide range of transparent materials, such as glasses or plastics, suitable for the intended application. It is generally preferred, but not required, that the scanner 12 be provided with a cover 56 sized to cover the platen 16 during the scanning operation. As is well-known, any of a wide range of objects 18 may be scanned by such a flat bed scanner 12. For example, in the embodiment shown and described herein, the object 18 may comprise a document 20 with written text 22 provided thereon, although other objects 18 may also be scanned.

The scanner 12 may also be provided with an image sensor 24 (FIG. 5) which, in the embodiment shown and described herein, may be housed within a moveable carriage assembly 26. The image sensor 24 is responsive to image light (not shown) reflected by the object 18 being scanned and produces image data (not shown) representative of the image light. Two types of imaging systems are commonly used to direct image light from the object onto the image sensor: Contact image sensor systems (CIS systems) and projection systems. Contact image sensing (CIS) systems are becoming increasingly popular and generally utilize an array of gradient index lenses (e.g., 60) to direct and focus the image light onto the surface of an image sensor which is known as a contact image sensor. Projection systems typically utilize a discrete lens assembly and one or more mirrors to direct the image light onto the image sensor which is typically a CCD. While the method according to the present invention may be used with either type of imaging system, the embodiment shown and described herein utilizes a CIS imaging system 55.

Figure 5:
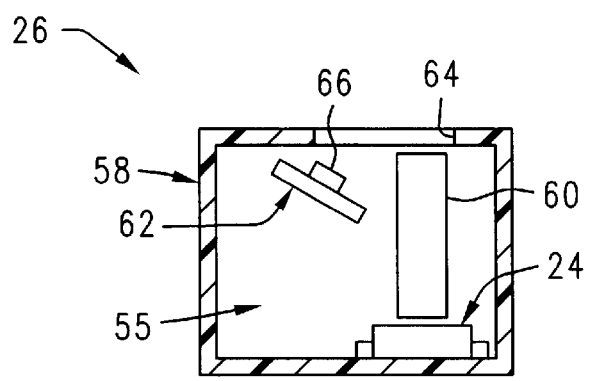
FIG. 5 is an enlarged cross section view in elevation of the moveable carriage assembly showing the relative positions of a gradient index lens array, image sensor, and light source assemblies.
Figure 6:
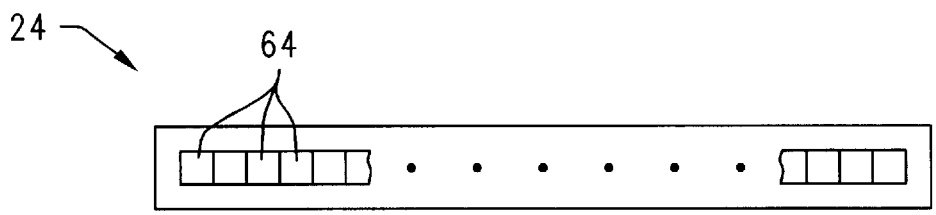
FIG. 6 is an enlarged plan view of the image sensor that may be utilized in one preferred embodiment of the invention.

Referring now to FIG. 5, the carriage assembly 26 utilized in one preferred embodiment of the present invention may comprise a generally elongate housing 58 sized to receive the CIS imaging system 55. The CIS imaging system 55 may, in turn, comprise the image sensor 24, a gradient index lens array 60, as well as a light source assembly 62. The arrangement is such that illumination light (not shown) produced by the light source assembly 62 passes through an elongate slot or aperture 64 provided in the housing 58 whereupon it is incident on the object 18 (not shown in FIG. 5, but shown in FIG. 7). The area on the object 18 that is illuminated by the light from the light source assembly 62 may be referred to herein as an "illuminated scan region." Image light (not shown) reflected by the object 18 (i.e., the illuminated scan region) passes through the aperture 64 whereupon it is directed and focused onto the image sensor 24 by the gradient index lens array 60. Thereafter, the image sensor 24 produces image data (not shown) representative of a portion of the illuminated scan region, generally referred to as a "scan line." Several different scan lines are illustrated schematically in FIG. 7 as scan lines 36, 36', 38 and 38'.

The various components of the CIS imaging sensing system 55 contained within the moveable carriage assembly 26 may comprise any of a wide range of components and devices that are well-known in the art or that may be developed in the future. For example, in one preferred embodiment, the light source assembly 62 may comprise an array of light emitting diodes (LEDs) 66 which produce light of a brightness that is sufficient to illuminate the scan region on the object 18 being scanned. Alternatively, other types of light sources, such as incandescent or fluorescent light sources, could also be used. It is preferred, but not required, that the gradient index lens array 60 used to direct and focus the image light onto the surface of the image sensor 24 comprise a gradient index lens array of the type sold under the name "SELFOC" which is a registered trademark of the Nippon Sheet Glass Company, Limited. Alternatively, other types of gradient index lens arrays may also be used. In still another alternative arrangement, and as was mentioned above, other types of imaging systems, such as projection imaging systems utilizing one or more mirrors and lens assemblies, could also be used to direct the image light from the illuminated scan region to the image sensor 24. Consequently, the present invention should not be regarded as limited to the particular imaging system (e.g., the CIS imaging system 55) shown and described herein.

With reference now to FIG. 4, the image sensor 24 may comprise a linear CIS photosensor array having a plurality of light sensitive cells arranged so that they form a linear array. Such photosensor arrays are well-known in the art and come in a wide variety of "native resolutions (i.e., number of light sensitive cells per unit length). Consequently, the present invention should be regarded as limited to any particular type of image sensor having any particular native resolution. However, by way of example, in one preferred embodiment, the image sensor 24 comprises a linear CIS photosensor array having a native resolution of 300 ppi (pixels per inch)

The carriage assembly 26 which contains the CIS imaging system 55 may be secured to a mounting system 28 contained within the housing 14. The mounting system 28 allows the carriage assembly 26 to be moved back and forth underneath the platen 16 along the scanning axis 30. While any of a wide range of mounting systems and configurations may be used, as would be obvious to persons having ordinary skill in the art, in one preferred embodiment, the mounting system 28 may comprise a pair of guide bars or rails 70 and 72 that are located in spaced-apart, generally parallel relation on opposite sides of the scanner housing 14. See FIG. 3. The carriage assembly 26 may be provided with a pair of guide bushings (not shown) sized to slidably engage the guide bars or rails 70 and 72, thereby allowing the carriage assembly 26 to be moved back and forth along the scanning axis 30, i.e., generally in the directions indicated by arrows 74.

Since the carriage assembly 26 is moveable, it is necessary to provide some means whereby the various components comprising the CIS imaging system 55 housed within the moveable carriage assembly 26 may be electrically connected to the image processing system 34 mounted to the side of the housing 14. While any of a wide range of suitable connecting systems and devices that are known in the art and readily commercially available could be used to connect the various components of the CIS imaging system 55 to the image processing system 34, by way of example, in one preferred embodiment, the various components of the CIS imaging system 55 are connected to the image processing system 34 by a ribbon cable 76.

The moveable carriage assembly 26 may be moved back and forth along the guide rails or bars 70 and 72 of the mounting system 28 by a carriage drive system 32. See FIG. 3. The carriage drive 32 may comprise any of a wide range of drive systems and types (e.g., cable drive systems, lead-screw drive systems, etc.) that are well-known in the art and which could be easily provided by persons having ordinary skill in the art. Consequently, the present invention should not be regarded as limited to any particular type or style of carriage drive system. However, by way of example, in one preferred embodiment, the carriage drive system 32 may comprise a cable-type drive system wherein a drive cable 78 and motor 80 are used to move the carriage assembly 26 along the guide rails 70 and 72. The belt 78 is attached to the carriage 26 at one end thereof. As a result of the asymmetric force which is applied to the carriage 26 by belt 78 the end 28 attached to the belt will lead the opposite end 29 slightly in both movement directions if there is any free play in the carriage mounting assembly such as for example "slop" between the bearings and rails or the bearing and carriage or in the bearing assembly itself. Since the carriage drive system 32 could be easily provided by persons having ordinary skill in the art after having become familiar with the teachings of the present invention, and since a detailed description of such a drive system is not required to understand or practice the present invention, the particular carriage drive system 32 utilized in one preferred embodiment of the present invention will not be described in further detail herein.

As was briefly described above, the mounting system 28 used to support the carriage assembly 26 comprises a certain degree of mechanical free play which causes the carriage assembly 26 to be skewed relative cross axis PP in a first direction during movement in scan direction 42 and in a second direction during movement in scan direction 43. Thus, a scan line 36 (FIG. 7) captured by the image sensor 24 during a scanning sweep in direction 42 generally will not be exactly aligned with a corresponding scan line 36' captured by the image sensor during a scanning sweep in direction 43. Similarly, an $n^{th}$ scan line 38 captured during a scanning sweep 42 will be displaced somewhat with respect to a corresponding $n^{th}$ scan line 38' captured during a scanning sweep in direction 43.

The mechanical free play associated with the cartridge mounting system 28 and cartridge drive system 32 is such that the displacement or shift between corresponding scan lines (e.g., 36 and 36' or 38 and 38') on successive scanning sweeps may occur in both the cross direction 40 and the scan direction 42. Further, the magnitude of the displacement need not be consistent among the various scan lines (e.g., 36, 36' or 38, 38') captured during the various scanning sweeps.

Generally, speaking, the amount of free play associated with the carriage mounting and drive systems 28 and 32 need not be substantial, e.g., no greater than a fraction of a pixel or so in either the cross or scan directions 40, 42, although greater displacement deviations may occur, particularly in worn or "sloppy" systems. By way of example, in one embodiment, the minimum displacement of the scan line between any two successive scans is in the range of about ¼ to about ¾ of a pixel. Regardless of the exact amount of free play that is associated with the carriage mounting and drives system 28 and 32, the present invention will operate satisfactorily so long as the displacement between successive scans is not exactly one pixel or an integer multiple of one pixel (e.g., 1, 2, 3, 4, or more pixels) for all the pixels of each scan line. Statistically, a situation wherein the carriage assembly 26 is displaced by exactly one pixel or an integer multiple thereof during the entire scan is almost infinitesimally small. That is, rarely, if ever, will a situation exist wherein the carriage assembly 26 is displaced by exactly one pixel or an integer multiple thereof along the entire length of the scan line, particularly when there is a skewed displacement, as opposed to merely a lateral or longitudinal displacement between carriage positions on succeeding scans. However, the chance of such a situation developing is so remote so as to be safely neglected.

It is generally preferred, but not required, that the flat bed scanner 12 also be provided with an image processing system 34 suitable for receiving the image data (not shown) produced by the image sensor 24 and for processing the image data according to the method 10 of the present invention. In an alternative embodiment, the image processing system 34 could be provided in a stand-alone device (e.g., a personal computer). However, it is conventional to provide the flat bed scanner with the image processing system 34. The image processing system 34 may comprise an application specific integrated circuit (ASIC) designed to handle and process the image data according to the method 10 shown and described herein, as well as to operate the other components (e.g., the carriage drive system 32, the light source assembly 62, etc.) of the flat bed scanner 12. Alternatively, the image processing system 34 may comprise a general purpose programmable micro-processor system of the type that are well-known in the art and that are readily commercially available.

The image processing system 34 may also be provided with a memory system (not shown), such as a random access memory (RAM) system, suitable for storing the image data produced by the image sensor 24. Alternatively, a mass data storage system, such as a magnetic or optical disk storage system may be used to store the image data and may be provided as a part of the scanner or on an associated PC or the like. However, since such memory systems are well-known in the art and could be easily provided by persons having ordinary skill in the art, the memory system (not shown) utilized in one preferred embodiment of the invention will not be described in further detail herein.

With reference now to FIG. 1, the method 10 for increasing the native scan resolution may begin at step 44 wherein the image processing system 34 is instructed to initiate the first scanning sweep. It is generally preferred, but not required, that the first scanning sweep be initiated with the carriage assembly 26 being located at an initial or home position 46 shown in FIG. 3. At this point, the image processing system 34 will turn-on the light source assembly 62 and begin moving the carriage assembly 26 along the scanning axis 30. As the carriage assembly 26 is moved, the image sensor 24 collects image data relating to a plurality of scan lines (e.g., 36 and 38, FIG. 7) and stores the image data in a memory system (not shown) at step 48. The image data collected during this first scanning sweep is referred to herein as the first image data set. The first image data set will have a given or native resolution in the cross direction 40 (e.g., 300 ppi) as well as a given or native resolution in the scan direction 42 (e.g., 300 ppi). Of course, the resolutions in the cross and scan directions 40 and 42 may be different depending on the particular type of scanner in which the method is used and depending on the particular scanning resolution selected by the user, if such a resolution selection option is provided.

A second scanning sweep may then be initiated at step 50. The second scanning sweep may be similar to the first scanning sweep described above, beginning with the carriage assembly 26, but this time at the end position 82. The carriage 26 is then moved in the opposite or reverse direction to collect the image data. The second scanning sweep will result in the production of a second image data set at step 52 which thereafter may be stored in the memory system (not shown) associated with the image processing system 34. The second image data set captured during the second scanning sweep will also have the same given or native resolutions in the cross and scan directions 40 and 42 as those of the first image data set. For example, in the embodiment shown and described herein, the given or native resolutions in the cross and scan direction 40 and 42 may be about 300 ppi, although other resolutions are possible, as described above.

The mechanical free play associated with the carriage mounting and drive systems 28 and 32 will cause the carriage assembly 26, thus the image sensor 24, to be displaced slightly between the first and second scanning sweeps. For example, a scan line 36' captured during movement in scanning direction 43 will be skewed at an angle equal to angle a plus angle b from a scan line 36 captured during the direction 42 scanning sweep. See FIG. 7. As was discussed above, the displacement between any two pixels in corresponding scan lines (e.g., 36 and 36') may range from a fraction of a pixel to several pixels. So long as the displacement is not zero pixels or an integer multiple of a pixel (e.g., 1, 2, 3, 4, or more pixels) across the entire scan line the method of the present invention will be effective in increasing the native resolution of the image sensor 24.

After the first and second image data sets corresponding to the first and second scanning sweeps have been collected, the method 10 may proceed to step 54 which combines the first and second image data sets to produce a single, high resolution data set. The high resolution data set will have resolutions in the cross and scan directions 40 and 42 that are both greater than those associated with the first and second image data sets.

It is contemplated that the invention concepts herein described may be variously otherwise embodied and it is intended that the appended claims be construed to include alternative embodiments of the invention except insofar as limited by the prior art.

What is claimed is:

1. A method for increasing a native resolution of an imaging assembly utilized in a scanner apparatus to produce image data representative of an object, comprising:

initiating a first scanning sweep by moving at least a portion of the imaging assembly along a scanning axis to produce a first image data set representative of the object being scanned, the first image data set having the native resolution;

initiating a second scanning sweep by moving said at least a portion of the imaging assembly along the scanning axis to produce a second image data set representative of the object being scanned, the second image data set having the native resolution, the positions of said at least a portion of the imaging assembly during the second scanning sweep being displaced from corresponding positions thereof during the first scanning sweep by mechanical free play between components of the scanner apparatus; and combining the first image data set and the second image data set to produce a high resolution image data set, the high resolution image data set having a resolution that is greater than the native resolution.

2. The method of claim 1, further comprising the step of mounting an image sensor portion of the imaging assembly to a moveable carriage assembly having a mechanical free play, the mechanical free play of the moveable carriage causing the image sensor mounted thereto to be displaced, during the second sweep, from corresponding positions of the image sensor during the first scanning sweep.

3. The method of claim 1, wherein the second scanning sweep is in an opposite direction as the first scanning sweep.

4. The method of claim 2, wherein the second scanning sweep is in an opposite direction as the first scanning sweep.

5. A method for increasing a native resolution of an image sensor utilized in a scanner apparatus to produce image data representative of an object, compriosing;

moving at least a portion of an imaging assembly associated with the image sensor aling a scanning axis during a first scanning sweep to produce a first image data set representative of the object being scanned, the first image data set having the native resolution;

moving said at least a portion of an imaging assembly associated with the image sensor along the scanning axis during a second scanning sweep to produce a second image data set representative of the object being scanned, the second image data set having the native resolution, the positions of the image sensor during the second scanning sweep being displaced from corresponding positions of the image sensor during the first scanning sweep by mechanical free play in the scanner; and combining the first image data set and the second image data set to produce a higher resolution image data set, the high resolution image data set having a resolution that is greater than the native resolution.

6. The method of claim 5, wherein the image sensor is mounted to a moveable carriage assembly having a mechanical free play, the mechanical free play of the moveable carriage assembly causing the image sensor mounted thereto during the second scanning sweep to be displaced from corresponding positions of the image sensor during the first scanning sweep.

7. The method of claim 6, wherein the displacement of the image sensor between the first scanning sweep and the second scanning sweep is not equal to an integer multiple of a pixel.

8. The method of claim 6, wherein the first scanning sweep is in a first scanning direction and wherein the second scanning sweep is in a second scanning direction opposite the first scanning direction.

9. A scanning apparatus comprising:

a. an imaging assembly having at least one scanningly displaceable component having mechanical free play therein;

i. said displaceable component having a first orientation relative a scanning axis during displacement in a first scan direction;

ii. said displaceable component having a second orientation relative said scanning axis during displacement in a second scanning direction opposite said first scanning direction;

iii. said first orientation being displaced relative said second orientation through said mechanical free play; and b. a data processor that combines an image data set generated during displacement of said component in said first scanning direction with an image data set generated during displacement of said component in said second scanning direction.

10. A scanning apparatus comprising scanning means having mechanical free play therein for scanning an object to generate a first image data set during movement in a first direction and a second image data set during movement in a second scanning direction, said second data set being displaced from said first data set through said mechanical free play, and means for combining said first and second data sets to produce a third data set having a resolution greater than said first or second data sets.

* * * * *

UNITED STATES PATENT AND TRADEMARK OFFICE
CERTIFICATE OF CORRECTION

PATENT NO.    : 6,278,101 B1
DATED         : August 21, 2001
INVENTOR(S)   : Puyot It is certified that error appears in the above-identified patent and that said Letters Patent is hereby corrected as shown below:

Column 11,
Line 45, delete "aling" and insert therefor -- along --

Signed and Sealed this

Twenty-fifth Day of November, 2003

JAMES E. ROGAN
*Director of the United States Patent and Trademark Office*